Nov. 13, 1962 J. J. RENIER 3,064,222
ELECTRICAL RESISTOR
Filed Aug. 12, 1959

INVENTOR.
JAMES J. RENIER
BY
ATTORNEY

United States Patent Office 3,064,222
Patented Nov. 13, 1962

3,064,222
ELECTRICAL RESISTOR
James J. Renier, Hopkins, Minn., assignor to Minneapolis-Honeywell Regulator Company, Minneapolis, Minn., a corporation of Delaware
Filed Aug. 12, 1959, Ser. No. 833,271
1 Claim. (Cl. 338—25)

The present invention relates to an improved temperature responsive electrical resistance element or relay which employs a fusible salt or electrolyte as the temperature sensing material in the unit. More particularly, this invention relates to such an apparatus wherein the electrode members are fusible, their fusion temperature being generally below that of the active electrolyte or salt component.

Briefly, according to the present invention, a pair of fusible electrodes are arranged in spaced relationship, the gap formed therebetween being bridged by a fusible salt or electrolyte. Electrical connections are made independently to each of the fusible electrodes and the resistance between the electrodes through the salt bridge is controlled by the temperature of the environment as well as the physical nature of the electrolyte. In the past, these devices have employed an electrode which is normally solid, or at least not fusible at the temperature at which the salt component becomes fused. In these units, dendritic growth between the electrodes occurring as a result of the application of A.C. thereacross, has been a serious problem with respect to the life of the devices. In this connection, a particular dendritic member may commence to grow in an area between the spaced electrodes and accordingly may cause a sharp drop in resistance between the electrodes. The device then is unable to distinguish between a fused condition in the electrolyte or the particular dendritic growth. This, in some applications would be a fail-unsafe condition, particularly in furnace-pilot light installations. Even though these devices are suitable for use only with an alternating current supply, they will nevertheless provide dendritic growth upon each cycle of current therethrough.

Accordingly, it is an object of the present invention to provide novel and improved electrical resistance elements which employ a fusible salt as the active component thereof, these units being particularly adapted to have extended lifetimes under normal operating conditions.

It is a further object of the present invention to provide an improved fusible salt relay device which employs a pair of electrode members which are fusible at a temperature below that in which the salt component becomes fused.

Other and further objects of the present invention will become apparent from a study of the following specification, claim, and accompanying drawings, wherein:

Figure 1:
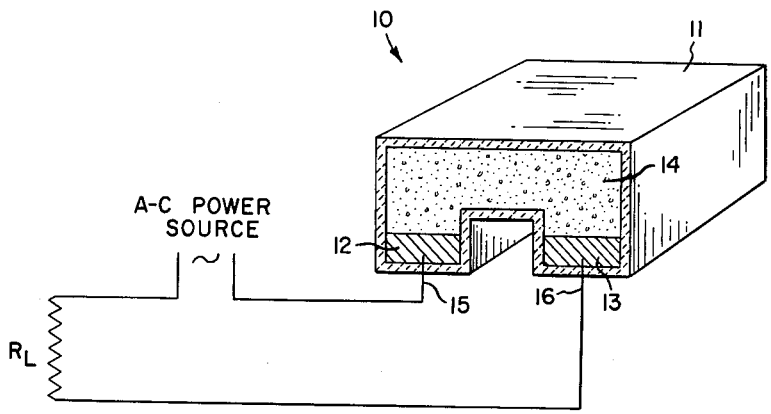
FIGURE 1 is a perspective view showing a cross section of a device prepared in accordance with the present invention, and also a simple schematic circuitry arrangement in combination therewith.

According to a preferred modification of the present invention, the fusible salt relay generally designated 10 is provided with an insulating housing 11 having a pair of fusible, spaced electrode members 12 and 13 arranged therein. Superimposed upon the electrodes 12 and 13 and bridging the gap therebetween is a fusible salt mixture designated 14 which is arranged to become highly conductive at a temperature which coincides substantially with the melting temperature of the particular salt or electrolyte. Also there are a pair of electrical leads 15 and 16 which make electrical contact through the shell 11 to the fusible electrode members 12 and 13. In various applications where a relatively large quantity of current would be required to flow between the electrodes, it would be desirable to have the electrode members 12 and 13 as elongated as is possible or practical. For example, the electrical current density would be at a substantially lower level in such an apparatus, and instances of localized overheating which may result in self fusing of the electrolyte would be held to a minimum. If desired, an alumina or other ceramic type porous inert support member may be included in the salt area 14.

Figure 2:
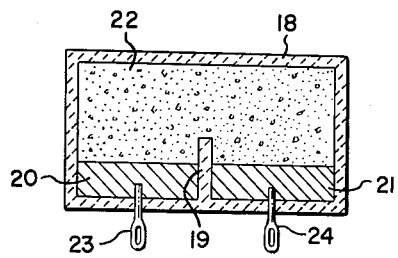
FIGURE 2 is a vertical sectional view of a modification of the device as shown in FIGURE 1.
Figure 3:
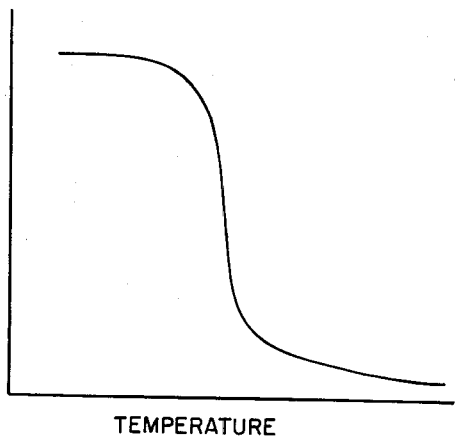
FIGURE 3 is a graph illustrating the relative electrical resistance response as a function of relative temperature in devices of this nature.

Reference is made to FIGURE 2 wherein the somewhat modified form of the invention is illustrated. In this particular device, the case or enclosure member 18 is provided with an upstanding dividing element 19 which separates fusible electrode members 20 and 21. A suitable salt fill 22 is placed on top of the electrodes 20 and 21. Electrical contact to the electrodes is made by means of the metallic conducting pins 23 and 24. The operation of this device is, of course, identical with that of the apparatus of FIGURE 1, the only difference being particular physical configuration of the enclosure 18.

Operation of the device such as this requires that the unit be substantially vertically mounted and be employed in a substantially vibration-free application in order to avoid spurious contact events.

In a typical device of this type, an enclosure member such as the enclosure member 11 is fabricated from glass, ceramic, or anodized aluminum. The electrodes are prepared from substantially pure bismuth and a lithium chloride-potassium chloride eutectic salt mixture is placed in superimposed relationship thereabove. The eutectic salt mixture fuses at about 352° C., which is substantially above that temperature at which bismuth fuses. In a device such as this, the normal operating temperature finds the bismuth substantially fused and the lithium chloride-potassium chloride eutectic fusing at a relatively higher temperature. Dendritic growth has been found to be substantially inhibited in a device such as this and hence the unit will operate in a fail-safe direction for certain applications.

In place of the lithium chloride-potassium chloride eutectic, other applications may find it desirable to employ other salts, such as one of these salts to the exclusion of the other. In addition, nitrates of the various alkali metals, such as sodium, potassium or lithium nitrate may also be employed successfully. It has been found that various of the alkaline earth nitrates and chlorides may be successfully employed. Of course, for virtually all applications, it is desirable that the salt member be introduced into the device in substantially anhydrous condition in that care be taken to prevent moisture from entering the unit. In place of bismuth, other metals such as cadmium, lead, or alloys of these metals with or without bismuth may be advantageously employed. It will be understood that the particular metal employed as the electrode in any case will not be critical, and many other metals or alloys could reasonably be selected for this application provided the metal is compatible with the salt or electrolyte employed.

Other and further modifications of the present invention may be prepared without departing from the scope of the present application. It will be understood that the example given in here is for purposes of illustration only and is not to be construed as a limitation to the coverage of this invention.

I claim as my invention:

A thermally responsive electrical resistance element comprising a pair of spaced metallic electrodes arranged to define a gap therebetween, said electrodes being of bismuth metal, and a body of fusible salt bridging said gap and making electrical contact with each of said electrodes, said fusible salt being a lithium chloride-potassium chloride eutectic.

References Cited in the file of this patent
UNITED STATES PATENTS 2,594,973 Muehlenkamp _____ Apr. 29, 1952

FOREIGN PATENTS 239,216 Great Britain _____ Dec. 28, 1926
537,155 Great Britain _____ June 11, 1941